(12) United States Patent
Torrini et al.

(10) Patent No.: US 9,231,792 B1
(45) Date of Patent: Jan. 5, 2016

(54) ADAPTIVE WIGIG EQUALIZER

(71) Applicant: Nitero Pty Ltd., Fitzroy, Victoria (AU)

(72) Inventors: Antonio Torrini, Austin, TX (US);
Darren Rae Di Cera, Fitzroy (AU);
Ngoc Vinh Vu, Austin, TX (US)

(73) Assignee: NITERO PTY LTD., Austin, TX (US)

( * ) Notice: Subject to any disclaimer, the term of this patent is extended or adjusted under 35 U.S.C. 154(b) by 0 days.

(21) Appl. No.: 14/601,855

(22) Filed: Jan. 21, 2015

(51) Int. Cl.
*H03H 7/30* (2006.01)
*H04L 25/03* (2006.01)

(52) U.S. Cl.
CPC .... *H04L 25/03019* (2013.01); *H04L 25/03159* (2013.01); *H04L 2025/03541* (2013.01)

(58) Field of Classification Search
CPC .................. H04L 25/03057; H04L 25/03885; H04L 25/03019; H04L 27/01; H04L 25/03159; H04L 2025/03541
See application file for complete search history.

(56) References Cited

U.S. PATENT DOCUMENTS

| | | | |
|---|---|---|---|
| 8,891,607 B2* | 11/2014 | Zhong | 375/233 |
| 2002/0196844 A1* | 12/2002 | Rafie et al. | 375/232 |
| 2003/0223489 A1* | 12/2003 | Smee et al. | 375/233 |
| 2006/0210003 A1* | 9/2006 | Yang et al. | 375/350 |
| 2007/0201544 A1* | 8/2007 | Zhu et al. | 375/229 |
| 2008/0107168 A1* | 5/2008 | Xia et al. | 375/233 |
| 2011/0305271 A1* | 12/2011 | Zerbe et al. | 375/232 |
| 2012/0236926 A1* | 9/2012 | Bourdoux et al. | 375/233 |

* cited by examiner

*Primary Examiner* — Kenneth Lam
(74) *Attorney, Agent, or Firm* — Hickman Palermo Becker Bingham LLP

(57) ABSTRACT

An adaptive equalization system and operating method thereof are disclosed herein. According to an embodiment, an apparatus comprises a plurality of equalizers and control logic to selectively enable one or more equalizers of the plurality of equalizers and disable one or more other equalizers of the plurality of equalizers based, at least in part, on a quality of the channel over which the signal is received. In another embodiment, the apparatus includes first control logic to select an equalizer for a header of a packet and second control logic to select an equalizer for a data payload of the packet.

19 Claims, 11 Drawing Sheets

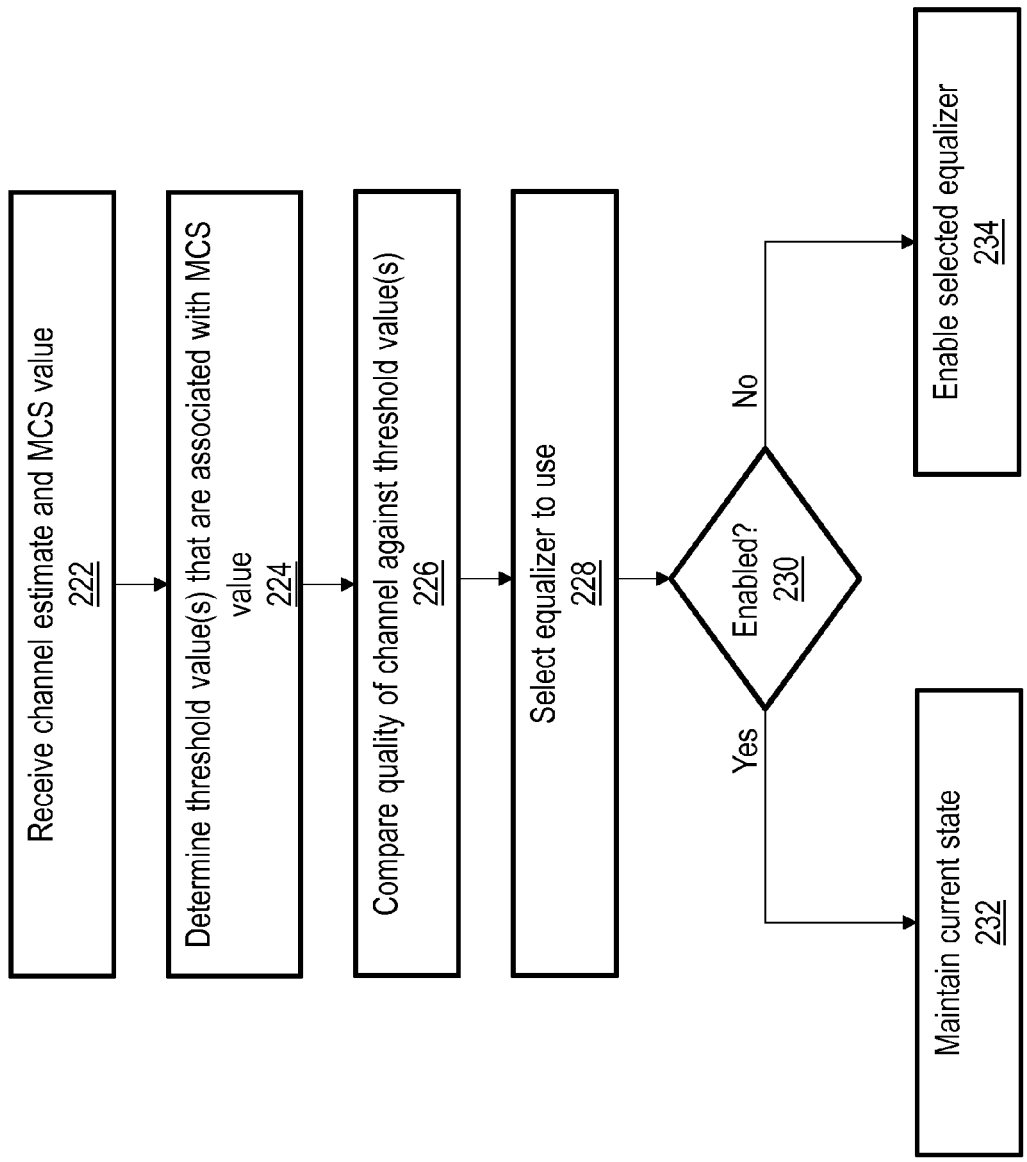

ADAPTIVE WIGIG EQUALIZER

FIELD OF THE DISCLOSURE

The present disclosure generally relates to adaptive equalizers and, more specifically, to a multi-equalizer system that adapts which equalizer is used based on detected conditions.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The availability of unlicensed millimeter-wave (mm-wave) radio frequency (RF) bands is spurring the development of main stream applications that use mm-wave wireless technologies. For example, the Institute of Electrical and Electronics Engineers (IEEE) 802.11ad standard, also known as WiGig, promises up to approximately 7 Gigabits per second data rate over the 60 GHz frequency band for consumer applications such as wireless transmission of high-definition video.

In digital wireless communications systems, including those that operate in or near the 60 GHz frequency band, multipath propagation results in a form of signal distortion referred to as inter-symbol interference (ISI), where one transmitted symbol interferes with subsequently transmitted symbols. If unaddressed, ISI may lead to a high bit error rate in the receiver process and prevent the signal from being correctly decoded. To mitigate the negative effects of ISI, the receiving device typically employs an equalizer that reverses the distortion, thereby flattening the channel frequency response.

Frequency domain equalizers (FDEs) are a class of equalizers that operate in the frequency domain when correcting distortion. These equalizers are generally more effective at correcting distortion than equalizers that operate in the time domain. However, when operating on WiGig or other high frequency signals, FDEs typically consume more power than other classes of equalizers. In some cases, an FDE may not yield significant improvements over equalizers that operate in the time domain, especially where signal distortion is relatively low.

An alternative to an FDE is a decision feedback equalizer (DFE). A DFE uses feedback from previous symbol decisions to eliminate ISI on an incoming signal. A DFE generally requires less power than an FDE, but also has inferior performance in terms of distortion correction. The DFE's inferior performance may result in relatively high bit error rates and incorrect decoding when the received signal is highly distorted. Therefore, a DFE may not be suitable in some applications.

BRIEF DESCRIPTION OF THE DRAWINGS

Embodiments are depicted by way of example, and not by way of limitation, in the figures of the accompanying drawings and in which like reference numerals refer to similar elements and in which:

FIG. 2B is a flowchart depicting an example process for deciding which equalizer to use at a second decision stage;

DETAILED DESCRIPTION

Figure 1A:
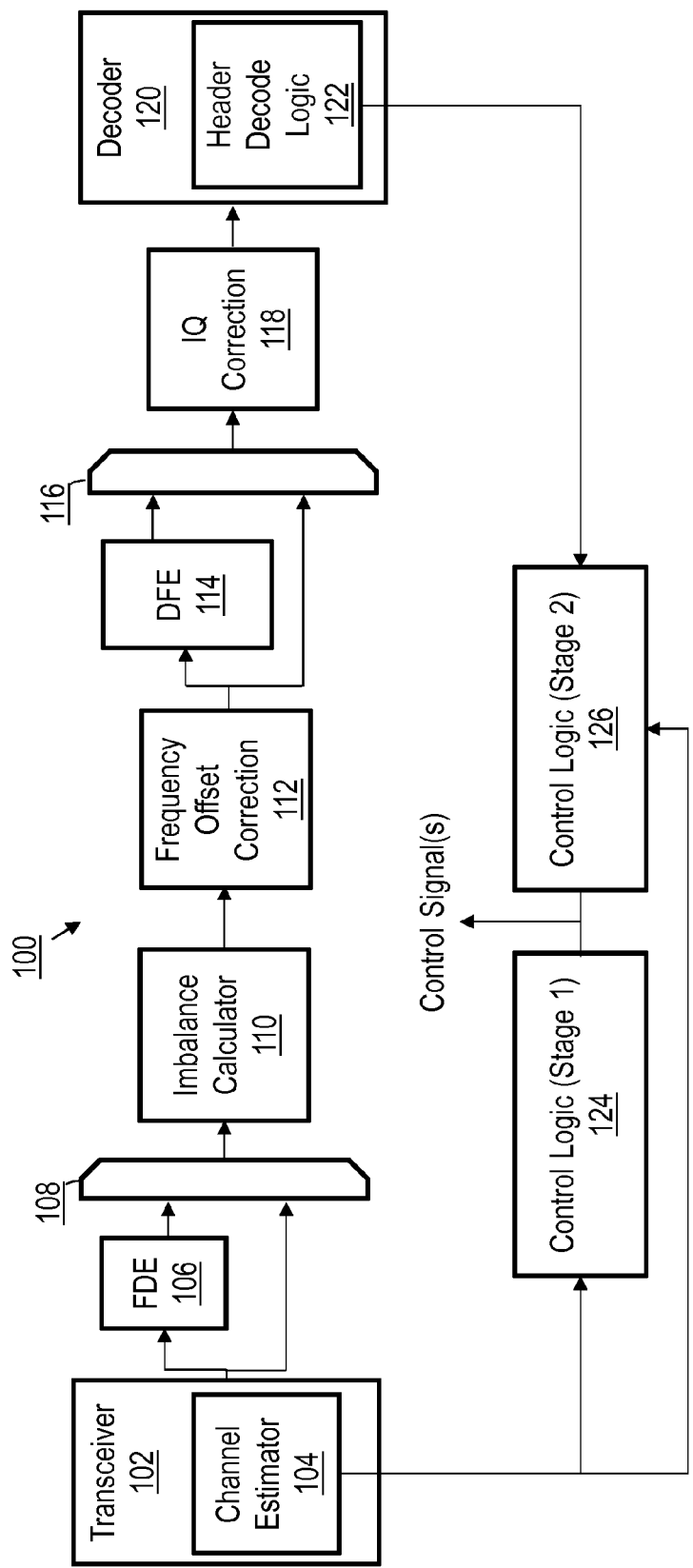
FIG. 1A is a block diagram depicting an example adaptive equalization system architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview

An adaptive equalization system and operating method thereof are disclosed herein. According to one embodiment, the adaptive equalization system comprises a plurality of equalizers and control logic to selectively enable one or more equalizers of the plurality of equalizers and disable one or more other equalizers of the plurality of equalizers based, at least in part, on a quality of a channel over which the signal is received. With a plurality of equalizers, the adaptive equalization system may take advantage of the relative strengths that different equalizers provide. For example, higher-power, more effective equalizers may be used when there is a relatively high level of noise and distortion, whereas lower-power alternatives may be used as the noise and distortion decrease.

In another embodiment, the adaptive equalization system includes first control logic to select an equalizer for a header of a packet and second control logic to select an equalizer for a data payload of the packet. Such control logic allows decoupling the equalization of the header of a packet from the equalization of the data payload, where the header may be equalized using a different equalization process than the data payload. Decoupling may be useful in various scenarios, including ones in which the header and payload data are modulated differently. The effectiveness of an equalizer may vary across different modulation and coding schemes.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor. Embodiments described herein may further be employed in Radio Frequency Integrated Circuits (RFICs) and devices that cover wide frequency ranges including, without limitation, the 60 GHZ frequency band. In such applications, the adaptive equalization system may be implemented to operate on WiGig and other high frequency signals.

II. Adaptive Equalizer Architecture

FIG. 1A is a block diagram depicting an example adaptive equalization system architecture. Adaptive equalization system 100 comprises various components including transceiver 102, channel estimator 104, FDE 106, multiplexer 108, imbalance calculator 110, frequency offset correction block 112, DFE 114, multiplexer 116, IQ correction block 118, decoder 120, header decode logic 122, control logic 124, and control logic 126. A "component" in this context may be implemented in hardware, software, firmware, and combinations thereof as previously indicated.

Transceiver 102 comprises a transmitter and receiver for wirelessly transmitting and receiving signals via radio waves. In one embodiment, the transceiver is operable to wirelessly transmit and receive signals over one or more channels in the 60 GHz band. The millimeter sized wavelengths in the 60 GHz band allow for relatively small antennas and for adaptive equalization system 100 to process high frequency signals, such as WiGig signals. In addition or as an alternative, transceiver 102 may be operable to transmit and receive signals in other frequency bands. In other alternative arrangements, adaptive equalization system 100 may comprise a receiver without a transmitter.

Channel estimator 104 calculates a channel estimate for one or more channels over which adaptive equalization system 100 communicates. A channel estimate in this context may generally comprise channel state information and/or other data that identifies the quality of a respective channel. The channel estimate may include, without limitation, data that identifies a signal to noise ratio (SNR), a signal to interference plus noise ratio (SINR), an ISI ratio, and/or a fading distribution for a respective channel. The manner in which channel estimator 104 calculates the channel estimate may vary from implementation to implementation. As an example, channel estimator may calculate the channel estimate using a least-square estimation, such as a least-mean square (LMS) or recursive-least-square (RLS) algorithm. As another example, the channel estimate may be calculated using a minimum mean square error (MMSE) estimation or by some other statistical analysis for estimating/classifying the channel quality.

FDE 106 represents a frequency domain equalizer that may be selectively enabled or disabled within the receiver process as described in further detail below. FDE 106 operates in the frequency domain to perform equalization of a received signal. As an example, FDE 106 may employ a fast Fourier transform (FFT) module to compute a frequency domain representation of a signal from time-domain samples of the signal. The equalization algorithm employed by FDE 106 to remove distortion from the received signal may vary from implementation to implementation. As an example, equalization weights may be assigned to different frequency components based on the channel estimate to adjust the balance of the different frequency components. Any other suitable frequency domain equalization algorithm may also be employed by this block.

Multiplexer 108 has two input lines, which are respectively coupled to FDE 106 and transceiver 102. The select line of multiplexer 108 is coupled to control logic 124 and control logic 126, allowing each respective control logic unit to select between the two input lines. When FDE 106 is selected, multiplexer 108 outputs the equalized signal received from FDE 106. Otherwise, multiplexer 108 outputs the unequalized signal received from transceiver 102.

Imbalance calculator 110 computes imbalance of a received signal. An "imbalance" in this context may refer to an amplitude imbalance between the in-phase and quadrature components of a signal, a phase imbalance between the in-phase and quadrature components of the signal, and an imbalance in the angle rotation of the signal. Imbalance calculator 110 may analyze known sequences of data that are periodically sent to compute the imbalances in the signal.

Frequency offset correction block 112 corrects for imbalances in the angle rotation of a signal. For example, frequency offset correction block 112 may increase or decrease the angle rotation based on any imbalances detected by imbalance calculator 110.

DFE 114 is a decision-feedback equalizer that operates in the time domain. DFE 114 analyzes received symbols and the channel estimate to subtract out interference and distortion caused by the channel. DFE 114 statistically analyzes a symbol to predict what the symbol should be and to compute the interference based on the prediction. The estimated interference is used as feedback to subtract out interference from a subsequently received symbol and to adjust the estimate. This process continues, resulting in feedback from previous symbol decisions being used to eliminate ISI on subsequent symbols. DFE 114 may consume less power than FDE 106. However, DFE 114 may be less effective for channels in noisy environments, when there is a high level of ISI, and/or when a complex modulation scheme is used. In such scenarios, using DFE 114 rather than FDE 106 may increase the likelihood of erroneously estimating interference, potentially corrupting subsequent symbols rather than correcting ISI.

Multiplexer 116 has two input lines, which are respectively coupled to DFE 114 and frequency offset correction block 112. The select line of multiplexer 116 is coupled to control logic 124 and control logic 126, and is used to select between the two input lines. When DFE 114 is selected, multiplexer 116 outputs the equalized signal received from DFE 114. Otherwise, multiplexer 108 outputs the signal received from frequency offset correction block 112.

IQ correction block 118 corrects the amplitude and phase imbalance between the in-phase and quadrature components of the signal. For example, IQ correction block 118 may adjust the phase of the in-phase component, quadrature component, or both such that there is a 90-degree phase offset between them. IQ correction block 118 may further increase or decrease the amplitude of the in-phase component, quadrature component, or both based on any imbalances computed by imbalance calculator 110.

Decoder 120 recovers binary data from received signals. Decoder may include, without limitation, a demodulator, error detection logic, and/or error correction logic for recovering the binary data. Decoder may output the decoded message in a bitstream or other format for processing by downstream components (not depicted) in a wireless device. In one embodiment, decoder comprises header decode logic 122 for identifying and extracting packet headers from received signals. For WiGig and some other types of signals, the packet headers may include a field identifying the modulation and coding scheme used for the data payload, where different field values correspond to different modulation and coding schemes. In such scenarios, header decode logic 122 may be configured to identify and extract data that identifies a modulation and coding scheme from the packet header. Header decode logic 122 is communicatively coupled to control logic 126, and may provide control logic 126 with the entire packet header and/or with a modulation and coding scheme value that identifies the modulation and coding scheme used for a data payload of the packet.

Control logic 124 is communicatively coupled with channel estimator 104 and receives the channel estimate as input. Based on the channel input, control logic 124 selectively enables and disables components within adaptive control system 100, thereby adjusting the data path of the receiver process. For example, control logic 124 may send control signals to FDE 106, multiplexer 108, DFE 114, and multiplexer 116 to select which equalizer to use on an incoming signal.

Control logic 126 is communicatively coupled to receive input from channel estimator 104 and header decode logic 122. Based on the channel estimate received from channel estimator 104 and header data received from header decode logic 122, control logic 126 outputs control signals to selectively enable and disable components within adaptive control system 100 and to adjust the active data path of the receiver process. In contrast to control logic 124, control logic 126 uses data extracted from packet headers to determine which components to enable and disable.

In alternative arrangements, adaptive control system 100 may include other classes of equalizers in addition to or in place of FDE 106 and DFE 114. For example, a time-domain equalizer may act as a third input to multiplexer 116 or may replace DFE 114. Control logic 124 and 126 may be implemented to select which of the plurality of equalizers to use based on an analysis of the input data, as described further below.

Components of adaptive control system 100 may support various modes of operation including one or more of the following:
  Enabled: While enabled, the corresponding component is fully operational and part of the active data path, such that the component receives data from upstream components and outputs data to downstream components in the receiver pipeline;
  Speculatively-enabled: A component that is speculatively enabled is operational/activated but is removed from the receiver pipeline such that the component may receive data from an upstream component in the receiver pipeline, but does not pass data to a downstream component in the receiver pipeline;
  Disabled: While disabled, the corresponding component remains inactive to conserve power and does not receive data from upstream components or pass data to downstream components in the receiver pipeline.

In an example implementation, a component may be enabled when a supplied enable signal is active and disabled when the enable signal is not active. In other implementations, a component may be clock gated and/or power gated to control whether it is enabled or disabled.

III. Stage One Decision and Header Equalization

As previously indicated, control logic 124 may be implemented to determine which of a plurality of equalizers to enable based on a channel estimate. This determination may be made at a first decision stage to select an equalizer to apply to the header of a packet. If the channel estimate indicates that the channel quality is especially poor, then control logic 124 may use FDE 106 to equalize the header. Selecting FDE 106 allows for more effective distortion removal in noisy environments, but may consume more power. If the channel quality is better than a threshold, then the FDE 106 may not provide significant benefits over using DFE 114 or another time-domain equalizer. Accordingly, if control logic 124 determines that the channel quality is better than the threshold, then control logic 124 may select DFE 114 or another time-domain equalizer to conserve power.

Figure 1B:
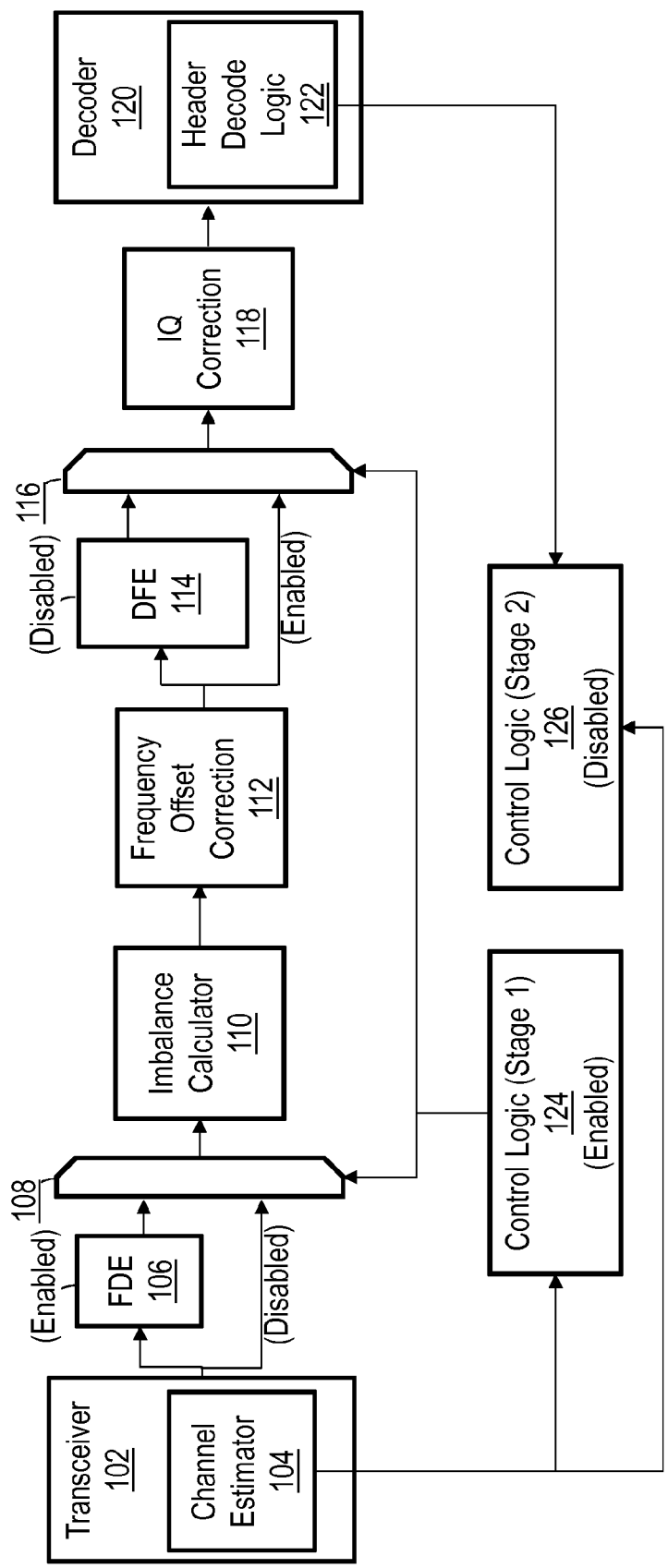
FIG. 1B is a block diagram depicting an example state of an adaptive equalization system when an FDE is selectively enabled at a first decision stage.

FIG. 1B is a block diagram depicting an example state of an adaptive equalization system when FDE 106 is selectively enabled at a first decision stage. In this state, FDE 106 is enabled and selected by multiplexer 108. DFE 114 is disabled, and multiplexer 116 selects the signal from frequency offset correction block 112. Thus, the active path flows through FDE 106, which equalizes the signal, and bypasses DFE 114.

Figure 1C:
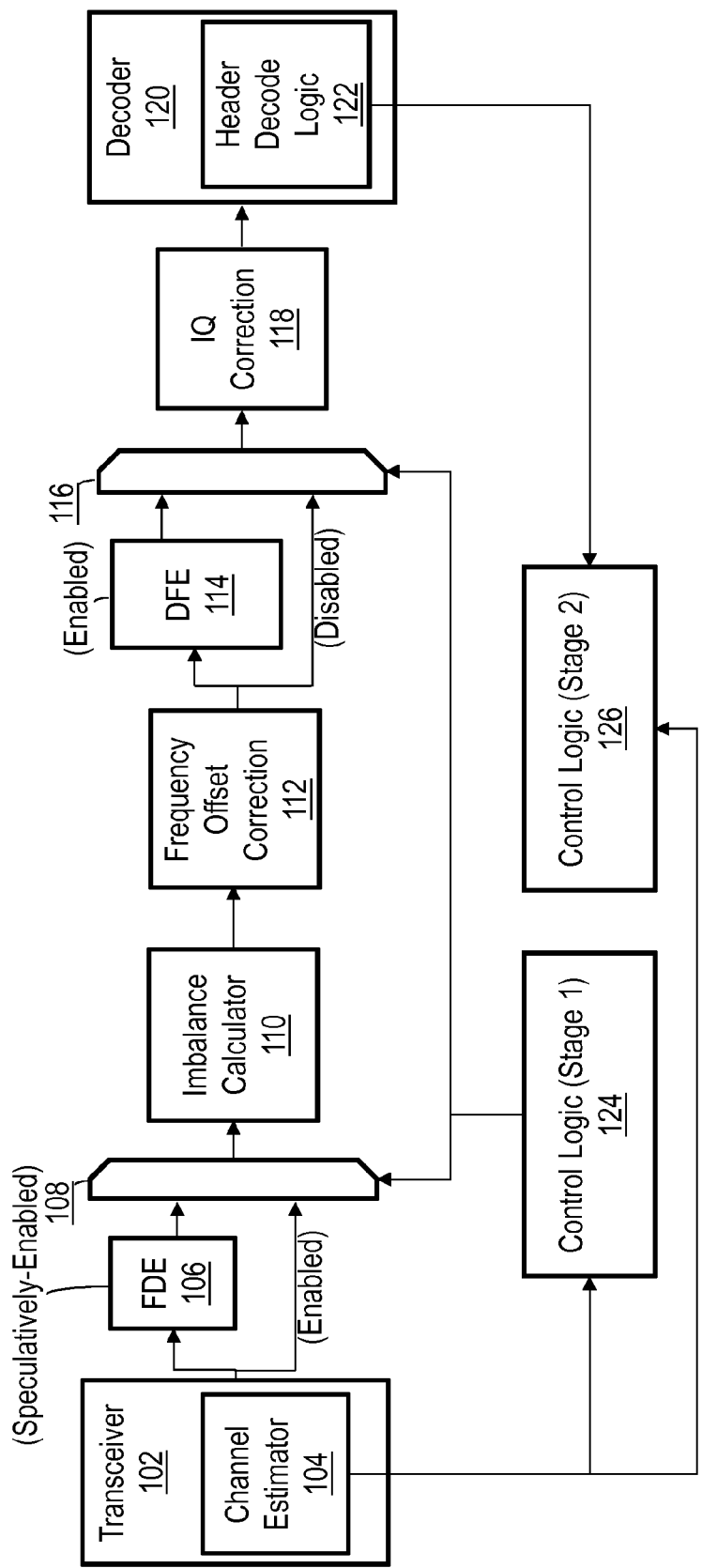
FIG. 1C is a block diagram depicting an example state of an adaptive equalization system when a DFE is selectively enabled at a first decision stage.

FIG. 1C is a block diagram depicting an example state of an adaptive equalization system when DFE 114 is selectively enabled at the first decision stage. In this state, DFE 114 is active and selected by multiplexer 116. In addition, FDE 106 is speculatively-enabled but unselected by multiplexer 108. While speculatively-enabled, FDE 106 equalizes the signal received from transceiver 102 but does not output the equalized version of the signal. The unequalized signal from transceiver 102 also bypasses FDE 106 down the receiver pipeline. Thus, FDE 106 is removed from the active data path in this state. Speculatively-enabling FDE 106 reduces data processing lag in the event that FDE 106 is enabled at a second stage decision.

Figure 2A:
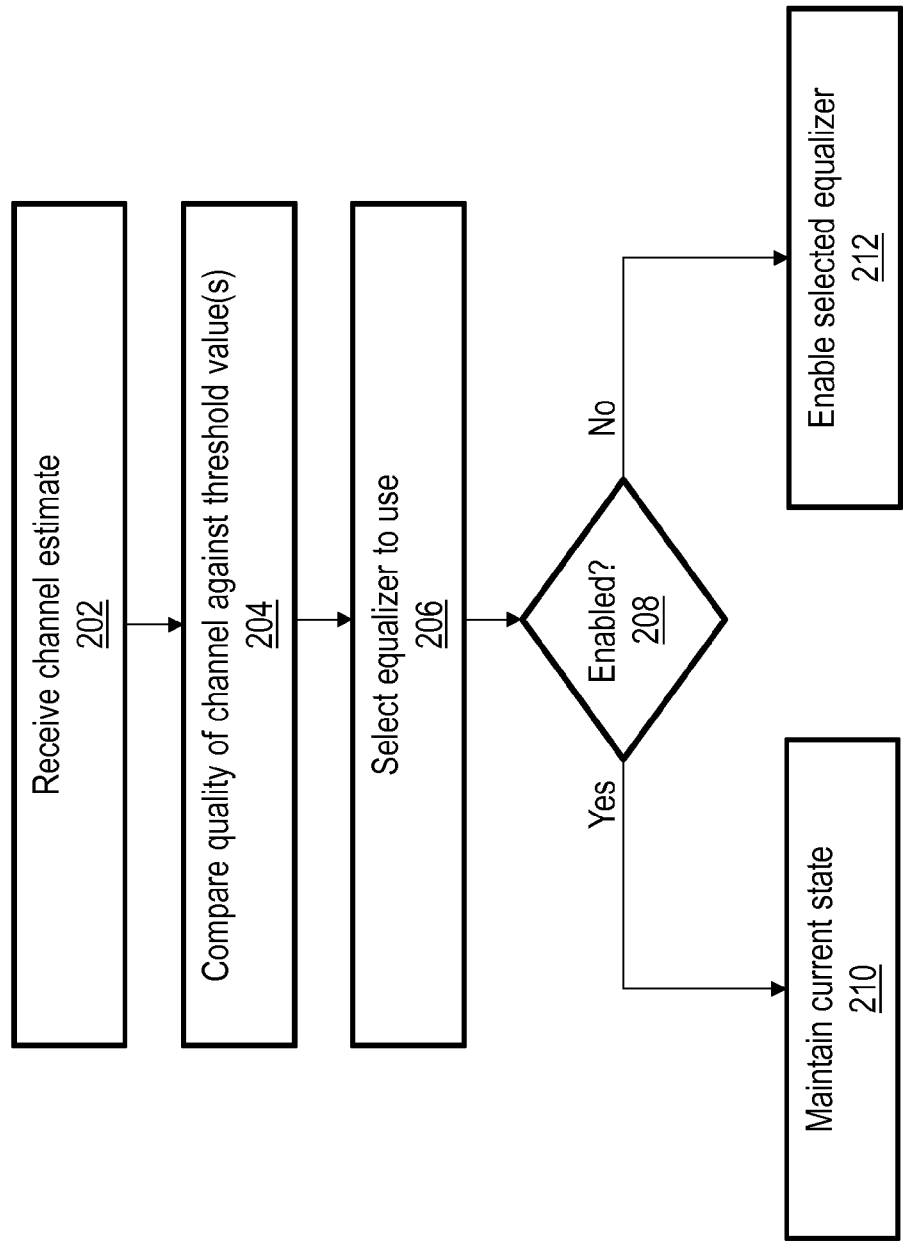
FIG. 2A is a flowchart depicting an example process for deciding which equalizer to use at a first decision stage.

FIG. 2A is a flowchart depicting an example process for deciding which equalizer to use at a first decision stage. At step 202, control logic 124 receives a channel estimate from channel estimator 104. As previously indicated, the channel estimate may comprise a set of one or more values (e.g., SNR, SINR, etc.) that indicate the quality of a respective channel.

At step 204, control logic 124 compares the channel estimate against a set of one or more threshold values. For example, control logic 124 may compare the SNR of the channel to determine whether it is greater than a threshold number of decibels and/or the ISI on the channel to determine whether it is greater than a threshold percentage.

At step 206, control logic 124 determines which equalizer to use based on the comparison performed at step 204. As an example, control logic 124 may select DFE 114 if the SNR is greater than a threshold value and FDE 106 otherwise. As another example, control logic 124 may select DFE 114 if the ISI is less than a threshold percent and FDE 106 otherwise. A combination of values may also be used at this step. For instance, control logic 124 may select DFE 114 if both the SNR is greater than a threshold level and the ISI is less than a threshold percentage. If either of these values does not satisfy their respective thresholds, then control logic 124 may select FDE 106 instead.

If control logic 124 is selecting between more than two equalizers at step 206, then multiple thresholds may be employed for each value. For example, control logic 124 may select FDE 106 if SNR is less than a first threshold, a time-domain equalizer (not depicted) if SNR is between a second threshold and the first threshold, and DFE 114 if greater than the second threshold.

At step 208, control logic 124 determines whether the equalizer selected at step 206 is already enabled. If already enabled, then at step 210, control logic 124 maintains the current state of the equalizer such that it remains active. If not enabled, then at step 212, control logic 124 enables the selected equalizer and disables (or speculatively-enables) any other equalizers that are currently active. For example, control logic 124 may send control signals to enable FDE 106 and disable DFE 114 or vice versa depending on which equalizer is selected.

IV. Stage Two Decision and Data Payload Equalization

Control logic 126 selects an equalizer from a plurality of equalizers based on both a channel estimate and data extracted from a packet header. By considering both factors, control logic 126 may select an appropriate equalizer for the type of packet given the current channel conditions. One equalizer may be more effective for one type of packet under certain channel conditions whereas another equalizer may be more affective for a different type of packet under the same conditions. As an example, for a given SNR on a channel, control logic 126 may select FDE 106 if a data payload received over the channel has a first modulation and coding scheme (MCS) and DFE 114 if the data payload has a second MCS.

In one embodiment, control logic 126 selects an equalizer to use for the data payload of a packet at a second decision stage. Control logic 126 may select the same equalizer that was used for the header of a packet or a different equalizer, depending on the conditions of the channel and the MCS for the data payload transmitted over the channel.

Figure 1D:
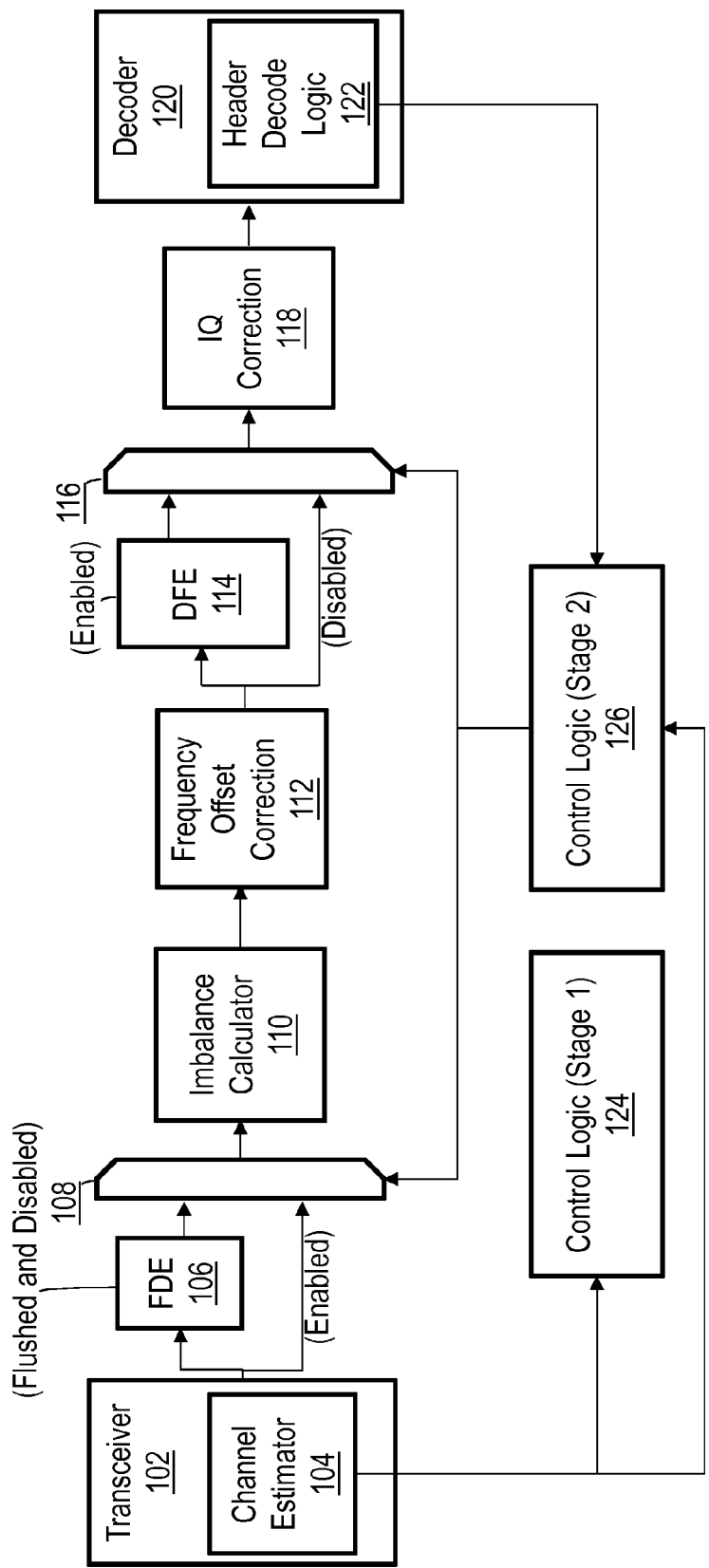
FIG. 1D is a block diagram depicting an example state of an adaptive equalization system when a DFE is selectively enabled at a second decision stage.

FIG. 1D is a block diagram depicting an example state of an adaptive equalization system when DFE 114 is selectively enabled at a second decision stage. In this state, FDE 106 is flushed and disabled and DFE 114 is operational. Control logic 126 may configure multiplexers 108 and 116 accordingly. The active path for the signal thus bypasses FDE 106, and decision feedback equalization is applied to the data payload of the packet.

Figure 1E:
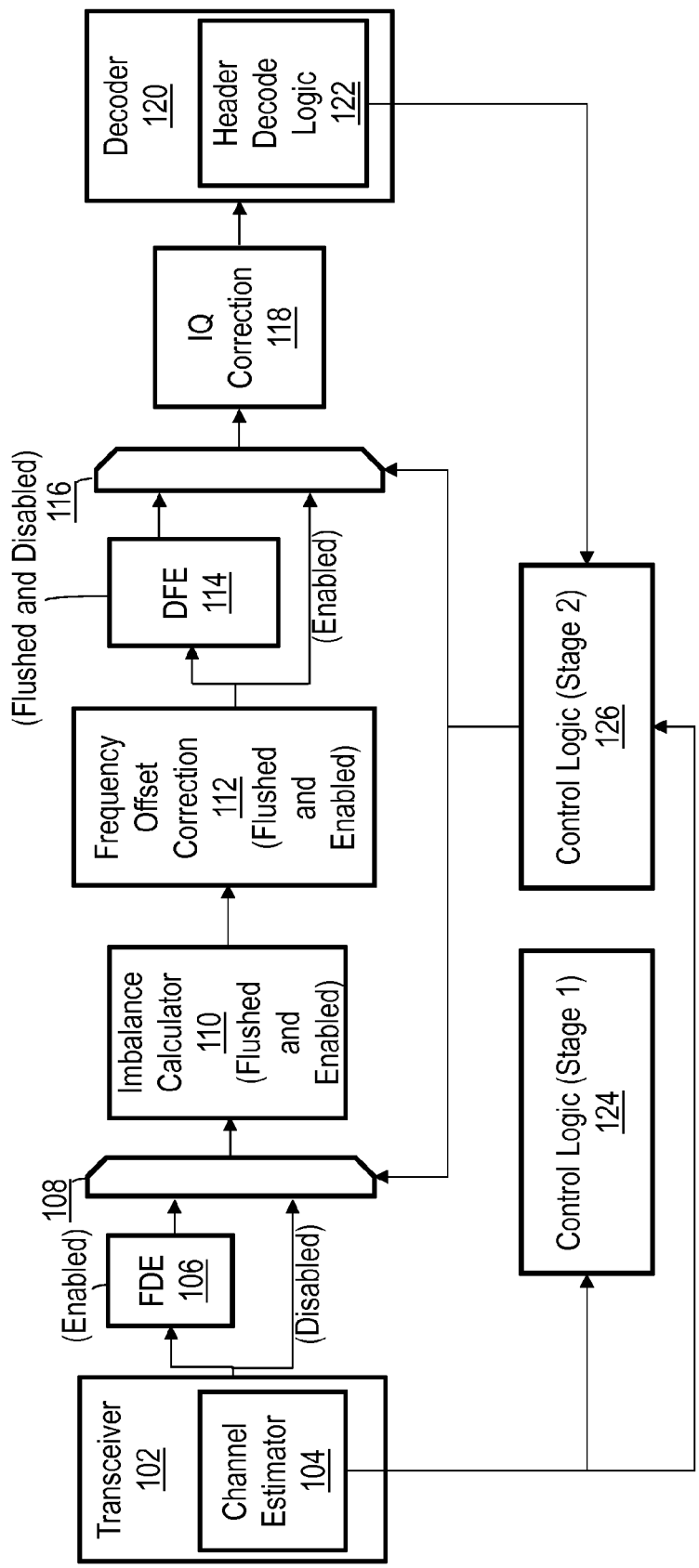
FIG. 1E is a block diagram depicting an example state of an adaptive equalization system when a FDE is selectively enabled at a second decision stage.

FIG. 1E is a block diagram depicting an example state of an adaptive equalization system when FDE 106 is selectively enabled at a second decision stage. In this state, FDE 106 is kept running. If speculatively-enabled at the first decision stage, then control logic 126 fully enables FDE 106 by selecting it from multiplexer 108. Control logic 126 may further cause imbalance calculator 110, frequency offset correction block 112, DFE 114, and IQ correction block 118 to flush data from their respective caches. Once flushed, imbalance calculator 110, frequency offset correction block 112, and IQ correction block 118 remain enabled, but DFE 114 is disabled. The active path for the signal thus bypasses DFE 114, and frequency domain equalization is applied to the data payload of the packet.

Figure 1F:
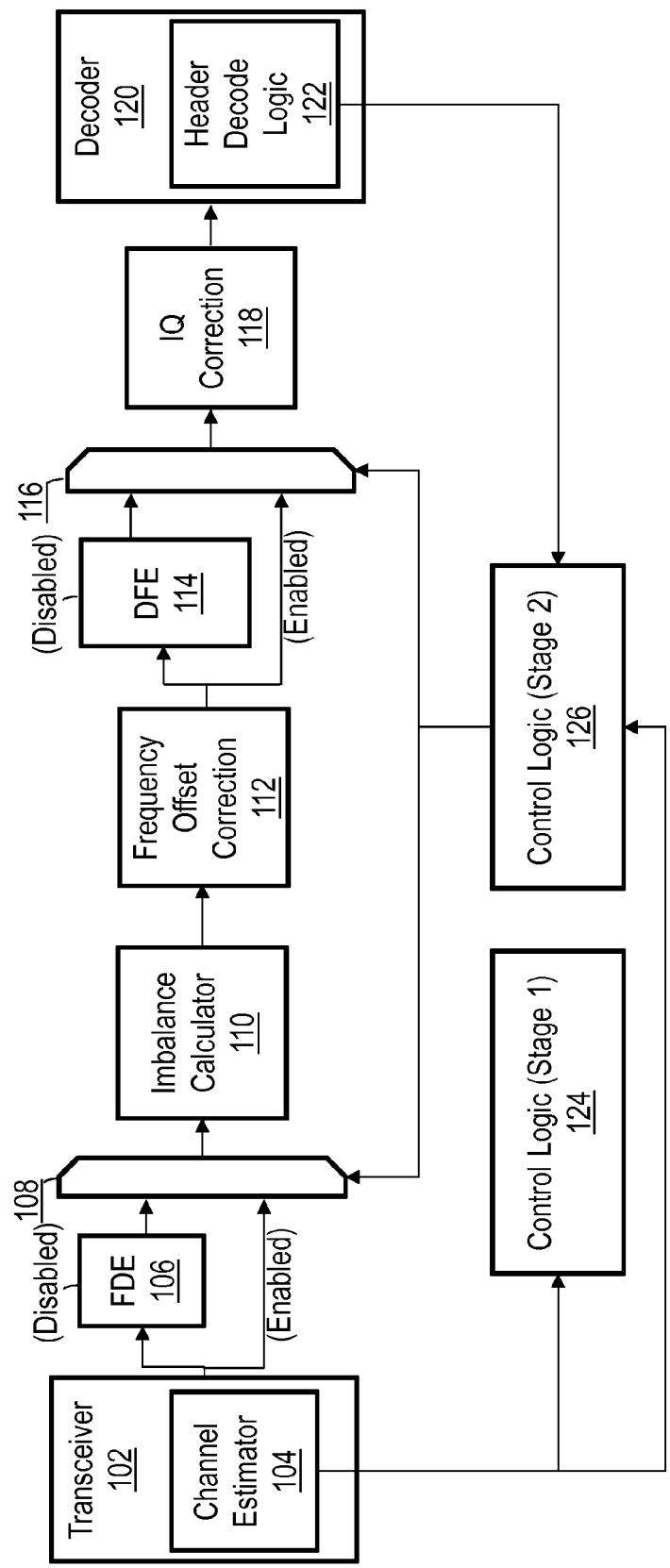
FIG. 1F is a block diagram depicting an example state of an adaptive equalization system where no equalizers are enabled at a second decision stage.

In some embodiments, control logic 126 may decide not to use an equalizer if the channel is clean enough. For example, DFE 114 may be applied to the header of a packet and, upon a determination that there is negligible ISI, the data payload of the packet may be processed without equalization. FIG. 1F is a block diagram depicting an example state of an adaptive equalization system where no equalizers are used per a decision made at a second decision stage. In this state, FDE 106 and DFE 114 are flushed and disabled. The active path for the signal thus bypasses both FDE 106 and DFE 114.

FIG. 2B is a flowchart depicting an example process for deciding which equalizer to use at a second decision stage. At step 222, control logic 126 receives a channel estimate from channel estimator 104 and an MCS value from header decode logic 122. The MCS value received at this step may vary from implementation to implementation. IEEE 802.11ad packet headers include a field value referred to as the MCS index. The MCS index specifies different numbers to identify different combinations of coders and modulation schemes. Example coders include ½, ¾, ⅝, ¹³⁄₁₆ low-density parity-check (LDPC) coders, while example modulation schemes include binary phase-key shifting (BPSK), quadrature phase-key shifting (QPSK), 16 quadrature amplitude modulation (QAM), and 64 QAM.

At step 224, control logic 126 determines a set of thresholds to use based on the MCS value. In one embodiment, control logic 126 maintains or otherwise has access to mapping data that maps MCS values to associated threshold values. For example, control logic 126 may store a table where each MCS value is mapped to a corresponding set of one or more SNR and/or ISI threshold values. Different thresholds may be used for different MCS values. For instance, an MCS value indicating that a ¾ LDPC coder and QPSK modulator was used for the data payload of a packet may be associated with a first set of one or more thresholds while a different MCS value indicating that a ½ LDPC coder and 16-QAM may be associated with a different set of thresholds. Thus, the selection of an equalizer may be tailored to the MCS of the data payload.

At step 226, control logic 126 compares the channel estimate against a set of one or more threshold values. For example, control logic 126 may compare the SNR of the channel to determine whether it is greater than a threshold number of decibels and/or may compare ISI on the channel to determine whether it is greater than a threshold percentage. In contrast to step 204, the threshold value used at this step may depend on the MCS value included in the packet header.

At step 228, control logic 126 determines which equalizer to use based on the comparison performed at step 226. As an example, control logic 126 may select DFE 114 if the SNR is greater than the threshold value for the corresponding MCS and FDE 106 otherwise. As another example, control logic 126 may select DFE 114 if the ISI is less than a threshold percent for the corresponding MCS and FDE 106 otherwise. A combination of values may also be used at this step. For instance, control logic 126 may select DFE 114 if both the SNR is greater than a threshold level for the corresponding MCS and the ISI is less than a threshold percentage for the MCS. If either of these values does not satisfy their respective thresholds, then control logic 124 may select FDE 106 instead. Additional threshold values may be used to select between more than two equalizers such as described above, and the threshold values used may vary from implementation to implementation.

At step 230, control logic 126 determines whether the equalizer selected at step 226 is already enabled. If already enabled, then at step 232, control logic 126 maintains the current state of the equalizer such that it remains active. If not enabled, then at step 234, control logic 126 enables the equalizer and disables any other equalizers that are currently active. For example, control logic 126 may send control signals to enable FDE 106 and disable DFE 114 or vice versa depending on which equalizer is selected.

V. Timing Diagrams

Figure 3:
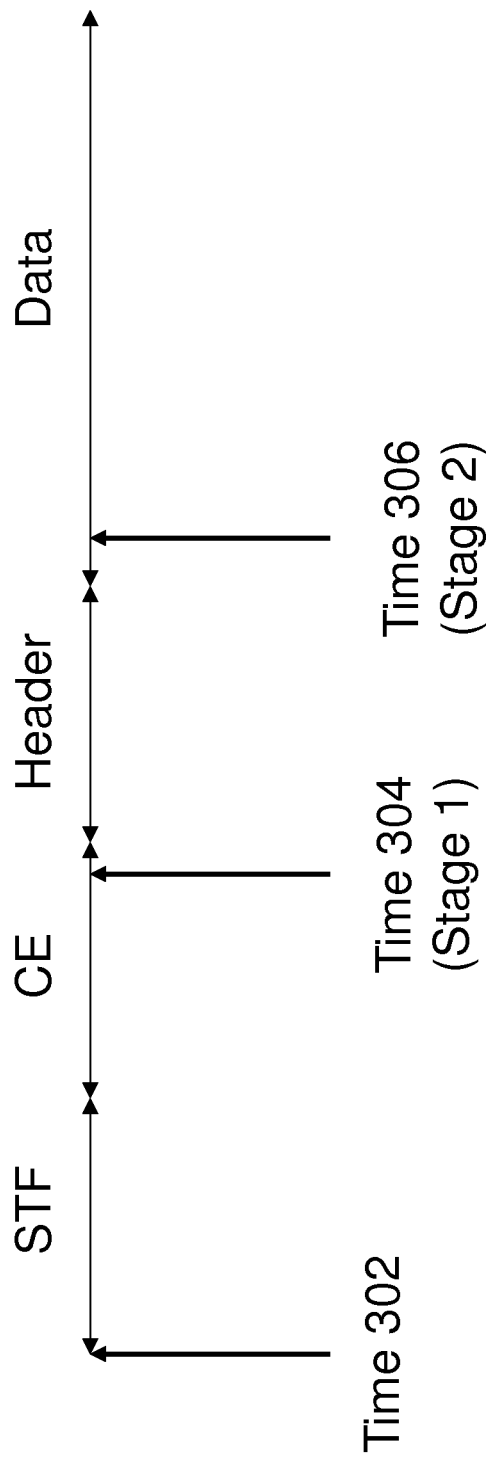
FIG. 3 is an example timing diagram depicting the first and second decision stages in relation to receipt of a packet.

FIG. 3 is an example timing diagram depicting the first and second decision stages in relation to receipt of a packet. At time 302, the receipt of a new packet begins. The packet includes a short training field (STF), a channel estimate (CE) field, also referred to as a long training field (LTF), a header, and a data payload. Channel estimator 104 computes a channel estimate from data included in the CE field. Once the channel estimate is computed, control logic 124 generates a first stage decision at time 304 and selects an appropriate equalizer for the packet header. After header decode logic 122 has extracted the MCS value from the header, control logic 126 generates a second stage decision at time 306 and selects an appropriate equalizer for the data payload.

Figure 4A:
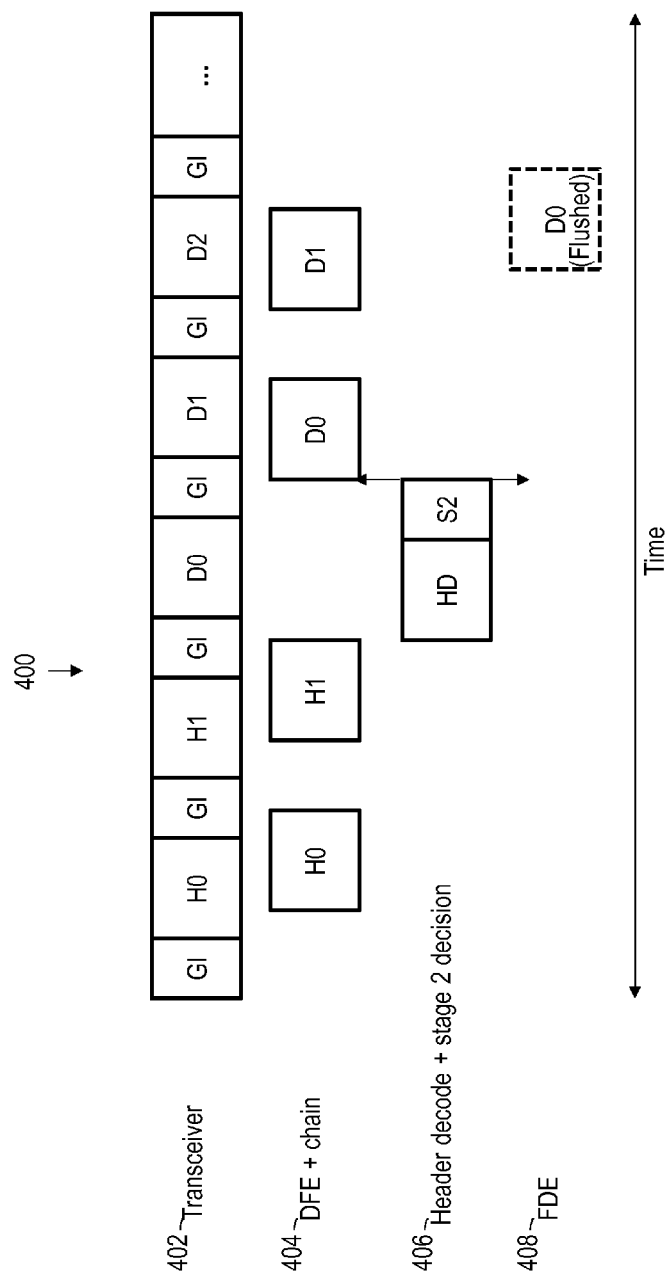
FIG. 4A is an example timing diagram representing data processing when a DFE is enabled at a second decision stage.

FIG. 4A is an example timing diagram representing data processing when DFE 114 is selected at the second decision stage. As depicted in timing diagram 400, row 402 corresponds to the timeframe during which transceiver 102 receives header data H0 and H1, followed by payload data D0, D1, D2, and so on. Row 404 indicates that there is a slight delay between when the transceiver receives the header data and when the header data is processed by DFE 114 and other components in the receiver chain before the header data is processed by the decoder. Row 406 depicts the header decode stage at block HD followed by the stage two decision at block S2. In the present example, the stage two decision selects DFE 114 to equalize the payload data. Referring back to row 404, it depicts payload data D0 and D1 being processed by DFE 114 after the stage two decision has been made. DFE 114 may include a buffer or other memory unit to delay output of equalized data until a decision is made a block S2. Row 408 depicts that FDE 106 is flushed before the output is ever active, where FDE 106 is speculatively-enabled before the stage two decision is made.

Figure 4B:
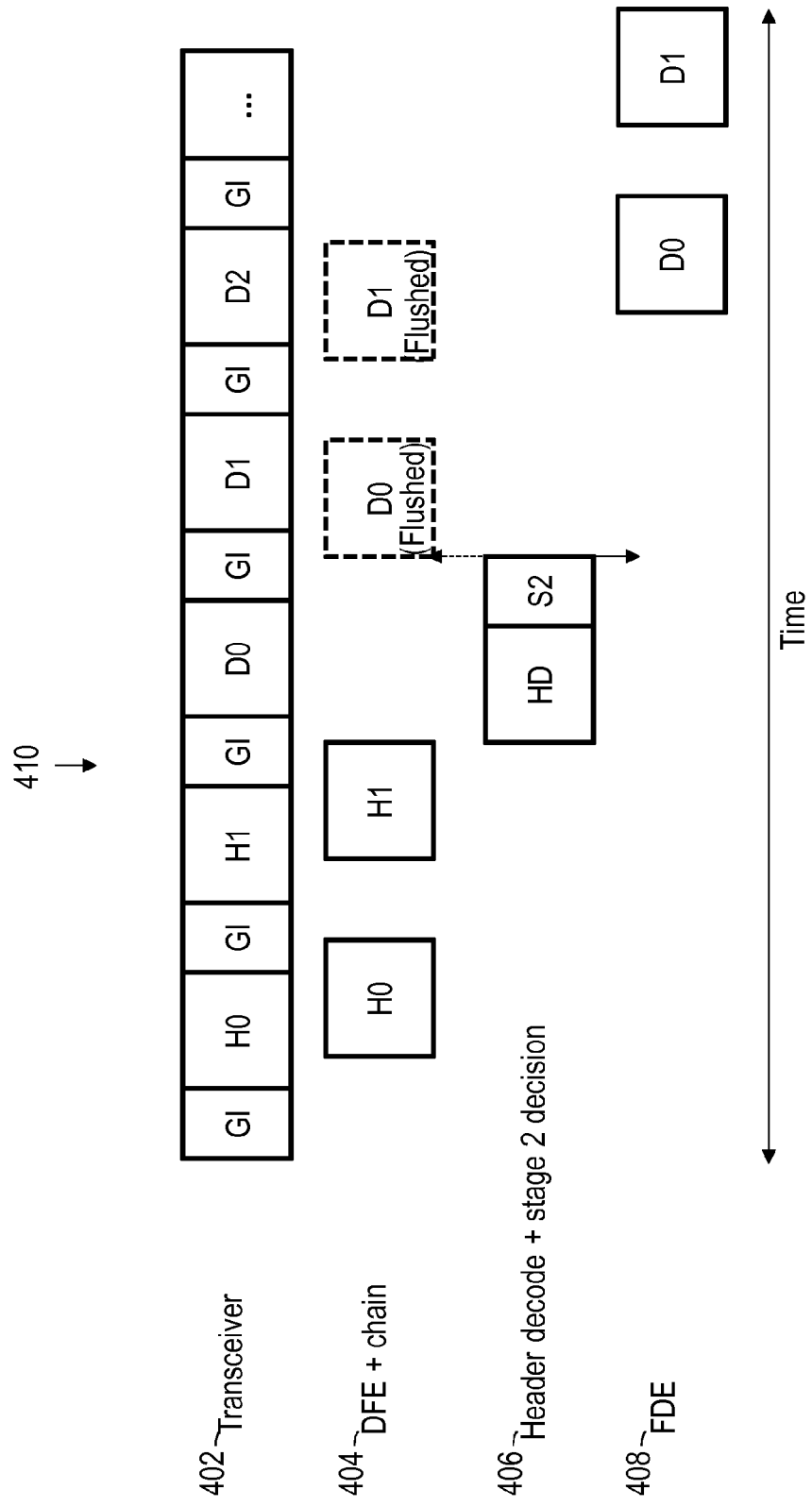
FIG. 4B is an example timing diagram representing data processing when an FDE is enabled at a second decision stage.

FIG. 4B is an example timing diagram representing data processing when FDE 106 is enabled at the second decision stage. Timing diagram 410 matches timing diagram 400, with the exception that the stage two decision at block S2 selects FDE 106 to equalize the payload data rather than DFE 114. In response, DFE 114 is flushed and FDE 106 is applied to the payload data. Speculatively-enabling FDE 106 helps reduce the time between the stage two decision at block S2 and completion of the equalization operation by FDE 106.

VI. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus that performs adaptive equalization on a signal comprising:
   a plurality of equalizers;
   control logic to selectively enable one or more equalizers of the plurality of equalizers and disable one or more other equalizers of the plurality of equalizers based, at least in part, on a channel estimate that estimates a quality of a channel for receiving the signal before the signal is equalized;
   wherein the control logic enables a first equalizer of the plurality of equalizers and disables a second equalizer of the plurality of equalizers if the quality of the channel falls within a first threshold;
   wherein the control logic enables the second equalizer of the plurality of equalizers and disables the first equalizer of the plurality of equalizers if the quality of the channel falls within a second threshold.

2. The apparatus of claim 1, wherein control logic is implemented to determine which one or more equalizers of the plurality of equalizers to enable based on the channel estimate that estimates the quality of the channel and based further on a modulation and coding scheme for a data payload transmitted over the channel.

3. The apparatus of claim 2, further comprising a decoder to decode a packet header from the signal and determine the modulation coding scheme from a value in the packet header.

4. The apparatus of claim 1, wherein the control logic is implemented to, when selectively enabling the one or more equalizers of the plurality of equalizers and disabling the one or more other equalizers of the plurality of equalizers, determine which one or more equalizers of the plurality of equalizers to enable based on threshold values for the quality of the channel.

5. The apparatus of claim 4, wherein the control logic is implemented to, when determining which one or more equalizers of the plurality of equalizer to enable based on threshold values for the quality of the channel, use different threshold values for different respective modulation coding schemes.

6. The apparatus of claim 1, wherein the plurality of equalizers include a frequency domain equalizer and a decision feedback equalizer.

7. The apparatus of claim 1, wherein the control logic is implemented to selectively enable the one or more equalizers of the plurality of equalizers and disable the one or more other equalizers of the plurality of equalizers at a first decision stage; the apparatus further comprising additional control logic to determine whether to change which of the plurality of equalizers is enabled and disabled at a second decision stage.

8. The apparatus of claim 1, wherein second control logic is implemented to determine whether to change which of the plurality of equalizers is enabled and disabled at a second decision stage based on the quality of the channel and a modulation and coding scheme; and wherein the control logic is implemented to selectively enable the one or more equalizers of the plurality of equalizers and disable the one or more other equalizers of the plurality of equalizers at the first decision stage independently of the modulation and coding scheme.

9. The apparatus of claim 1, further comprising a channel estimator that estimates the quality of the channel based on at least one of an amount of inter-symbol interference or a signal to noise ratio on the channel.

10. The apparatus of claim 1, wherein the control logic is further implemented to configure an equalizer such that the equalizer is speculatively-enabled; wherein a speculatively-enabled equalizer equalizes the signal while being bypassed by an unequalized version of the signal.

11. The apparatus of claim 1, wherein the plurality of equalizers are configured to operate in the 60 GHz frequency band.

12. An apparatus that performs adaptive equalization on a signal received over a channel comprising:
   a plurality of equalizers;
   first control logic to select, from the plurality of equalizers at a first decision stage, a first equalizer to apply to at least one packet header;
   wherein the first control logic is implemented to select the first equalizer by sending, based on a quality of a channel over which a packet is transmitted, a first set of control signals to enable the first equalizer and to disable a first set of one or more equalizers from the plurality of equalizers;
   second control logic to select a second equalizer from the plurality of equalizers at a second decision stage for deciding which of the plurality of equalizers to apply to at least one data payload;

wherein the second control logic is implemented to select the second equalizer by sending, based on the quality of the channel over which the packet is transmitted and a modulation coding scheme used for a data payload of the packet, a second set of control signals to enable the second equalizer and to disable a second set of one or more equalizers from the plurality of equalizers.

13. The apparatus of claim 12,
wherein the second control logic is implemented to select, as the second equalizer, the same equalizer as the first equalizer when the quality of the channel falls within a first threshold associated with the modulation coding scheme and a different equalizer than the first equalizer when the quality of the channel falls within a second threshold associated with the modulation coding scheme.

14. The apparatus of claim 12, wherein the second control logic is implemented to determine the modulation coding scheme from a value within the header of the packet.

15. The apparatus of claim 12, wherein the first control logic is implemented to select the first equalizer in response to determining that the quality of the channel satisfies a threshold value.

16. The apparatus of claim 12, wherein the second control logic is implemented to identify a threshold value based on the modulation coding scheme and select the second equalizer from the plurality of equalizers in response to determining that the quality of the channel satisfies the threshold value.

17. The apparatus of claim 12, the apparatus further comprising:
wherein the second control logic is implemented to select, as the second equalizer, a different equalizer than the first equalizer based on a comparison of a set of one or more values representing a quality of the channel with a set of one or more threshold values associated with a modulation and coding scheme used to modulate a data payload received over the channel.

18. The apparatus of claim 12, wherein the second control logic is implemented to select no equalizer for a corresponding data payload if a quality of the channel satisfies a threshold.

19. The apparatus of claim 12, wherein the first equalizer and the second equalizer include one of a frequency domain equalizer, a decision feedback equalizer, or a time domain equalizer.

\* \* \* \* \*